US012598165B2

(12) United States Patent
Unal et al.

(10) Patent No.: US 12,598,165 B2
(45) Date of Patent: Apr. 7, 2026

(54) STATELESS WEB ELEMENTS THAT DECODE OR DECRYPT DATA

(71) Applicant: Capital One Services, LLC, McLean, VA (US)

(72) Inventors: Erol Unal, Allen, TX (US); Jason Vanderslice, Plano, TX (US); Mark Morrison, Plano, TX (US); Preetha Veeraraghavan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 112 days.

(21) Appl. No.: 18/593,483

(22) Filed: Mar. 1, 2024

(65) Prior Publication Data

US 2025/0279985 A1 Sep. 4, 2025

(51) Int. Cl.
*H04L 9/40* (2022.01)
*G06F 21/60* (2013.01)
*H04L 67/02* (2022.01)

(52) U.S. Cl.
CPC ........ *H04L 63/0428* (2013.01); *G06F 21/602* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,093,129 B1 * | 8/2006 | Gavagni | ............... | H04L 9/3263 |
| | | | | 713/153 |
| 9,117,062 B1 * | 8/2015 | Fitch | ........................ | H04L 63/08 |
| 9,432,189 B1 * | 8/2016 | Wu | ........................ | H04L 63/045 |
| 9,571,471 B1 * | 2/2017 | Kupreev | ................. | H04L 67/02 |
| 10,110,579 B2 * | 10/2018 | Fitch | ...................... | H04L 9/3213 |
| 12,273,443 B2 * | 4/2025 | Valkaitis | ................... | H04L 9/14 |
| 12,368,756 B2 * | 7/2025 | Glynn | ................... | H04L 63/166 |
| 2008/0148408 A1 * | 6/2008 | Kao | ..................... | H04L 63/1433 |
| | | | | 726/25 |
| 2008/0281921 A1 * | 11/2008 | Hunt | ........................ | H04L 67/02 |
| | | | | 709/206 |
| 2014/0068269 A1 * | 3/2014 | Zhou | ................... | H04L 63/0428 |
| | | | | 713/171 |
| 2015/0365384 A1 * | 12/2015 | Rider Jimenez | .... | H04L 63/0435 |
| | | | | 380/252 |
| 2016/0173280 A1 * | 6/2016 | Tribble | ................... | G06F 21/60 |
| | | | | 713/153 |
| 2016/0241403 A1 * | 8/2016 | Lindemann | ......... | H04L 63/0861 |
| 2021/0367767 A1 * | 11/2021 | Saravanan | ............ | H04L 9/0844 |
| 2022/0182459 A1 * | 6/2022 | Shribman | ............... | H04L 67/06 |

* cited by examiner

*Primary Examiner* — Lashonda Jacobs-Burton
(74) *Attorney, Agent, or Firm* — Harrity & Harrity, LLP

(57) ABSTRACT

In some implementations, a user device may receive, from a web host, code associated with a webpage. The user device may perform, using a host application, at least one call to an application programming interface (API) function on behalf of a stateless web element in the webpage. The user device may receive, in response to the at least one call to the API function, encoded data. The user device may pass the encoded data to a stateless web element for decoding. The user device may output a rendered webpage with the stateless web element including a decoded version of the encoded data.

20 Claims, 19 Drawing Sheets

700

710 ~ Receive, from a web host, code associated with a webpage

720 ~ Perform, using a host application, at least one call to an API function on behalf of a stateless web element in the webpage 730 ~ Receive, in response to the at least one call to the API function, encoded data 740 ~ Pass the encoded data to the stateless web element for decoding 750 ~ Output a rendered webpage with the stateless web element including a decoded version of the encoded data

100

105
Request for
webpage

110
Code associated
with the webpage

Web
host

User
device

100

115
Load web element in webpage

120
Handshake

125
API call from host application

130
Response with encoded or encrypted data

Data source

User device

135
Pass the encoded/ encrypted data to the web element

140
Decode/ decrypt the data at the web element

User device

100

100

145
Render and output the
webpage

150
Updated code with
additional web element

Web
host

User
device

175
Pass additional encoded/ encrypted data to the additional web element

180
Decode/decrypt additional data at the additional web element

User device

185
Re-render and output the webpage

100

200

205
Request for
webpage

210
Response indicating that
webpage is rendering

Web
server

User
device

Web
host

215
Request

220
Code associated
with the webpage

Web
server

200

200

245
Pass the encoded/ encrypted data to the web element

250
Decode/ decrypt the data at the web element

Web server

200

265
Updated code with
additional web element

Web
host

Web
server

300

305-2

$ 414 /mo 305-1 — 4.99% APR · 60 mos. · $5,000 Down

Estimated payments and rate 305-3
$ 414 /mo
edit pre-qualified offer 305-4
$ 1,122
Taxes and fees $5,000
Down Payment $1,000
Trade-In Value Applied 305-5
$ 414 /mo 305-6
$ 44,932
Amount to finance

600

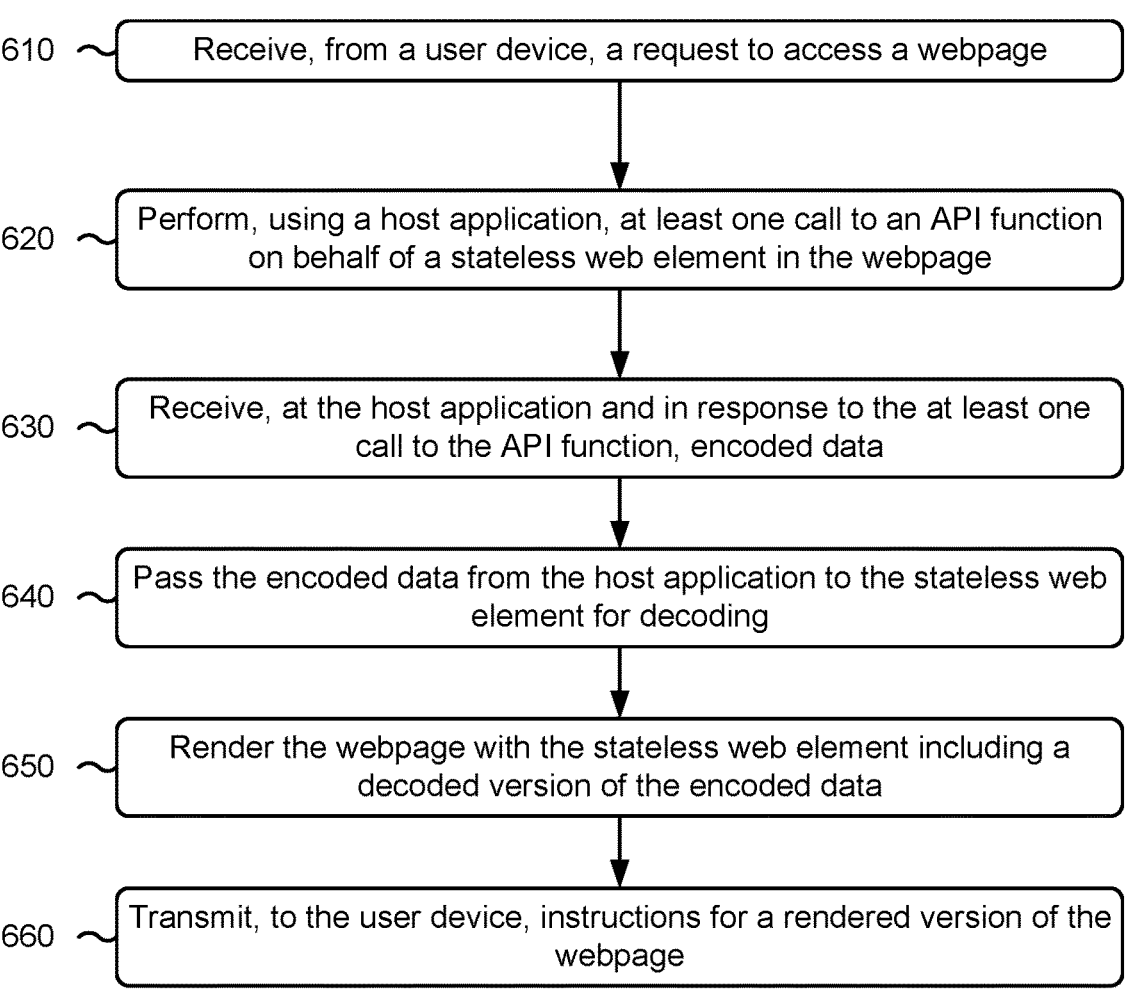

610 — Receive, from a user device, a request to access a webpage

620 — Perform, using a host application, at least one call to an API function on behalf of a stateless web element in the webpage 630 — Receive, at the host application and in response to the at least one call to the API function, encoded data 640 — Pass the encoded data from the host application to the stateless web element for decoding 650 — Render the webpage with the stateless web element including a decoded version of the encoded data 660 — Transmit, to the user device, instructions for a rendered version of the webpage

FIG. 6

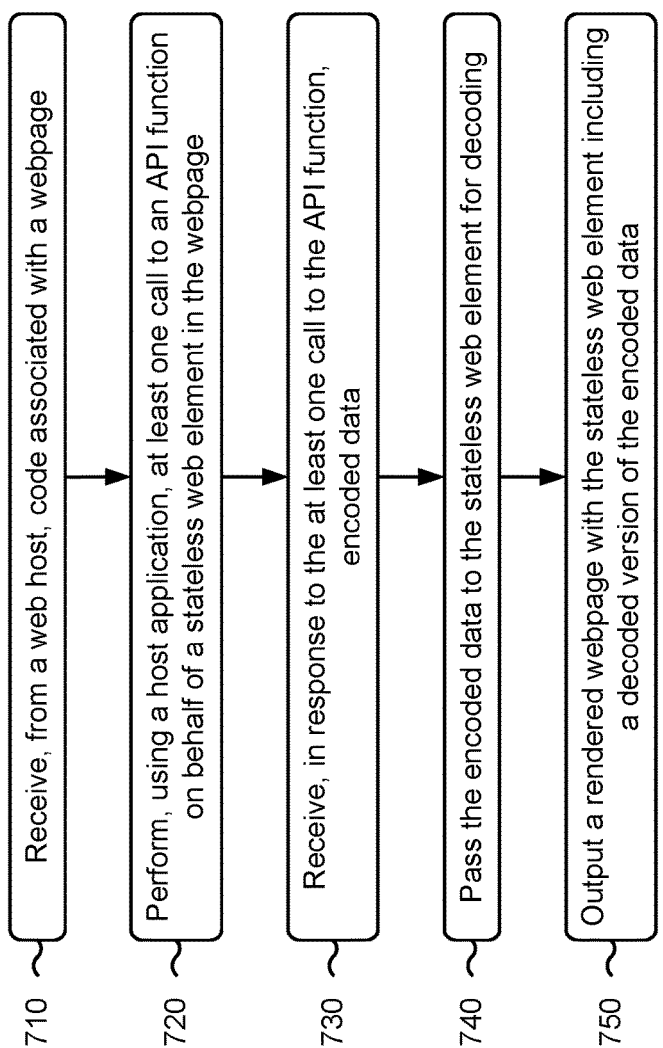

710   Receive, from a web host, code associated with a webpage

720   Perform, using a host application, at least one call to an API function on behalf of a stateless web element in the webpage 730   Receive, in response to the at least one call to the API function, encoded data 740   Pass the encoded data to the stateless web element for decoding 750   Output a rendered webpage with the stateless web element including a decoded version of the encoded data

STATELESS WEB ELEMENTS THAT DECODE OR DECRYPT DATA

BACKGROUND

Different webpages may obtain data from a same data source. For example, an aggregator webpage may request data from a same data source as a vendor webpage. However, each webpage may process the data differently, resulting in contradictory data on the different webpages. Additionally, updates to a webpage may trigger new calls to the data source, which results in more network overhead.

SUMMARY

Some implementations described herein relate to a system for using stateless web elements. The system may include one or more memories and one or more processors communicatively coupled to the one or more memories. The one or more processors may be configured to receive, from a web host, code associated with a webpage. The one or more processors may be configured to perform a handshake between a stateless web element in the webpage and an application programming interface (API) function in order to establish a shared secret. The one or more processors may be configured to perform, using a host application, at least one call to the API function on behalf of the stateless web element. The one or more processors may be configured to receive, in response to the at least one call, encrypted data. The one or more processors may be configured to pass the encrypted data to the stateless web element for decryption using the shared secret. The one or more processors may be configured to output a rendered webpage with the stateless web element including a decrypted version of the encrypted data.

Some implementations described herein relate to a method of using stateless web elements. The method may include receiving, from a user device and at a web server, a request to access a webpage. The method may include performing, using a host application executed by the web server, at least one call to an API function on behalf of a stateless web element in the webpage. The method may include receiving, at the host application and in response to the at least one call to the API function, encoded data. The method may include passing the encoded data from the host application to the stateless web element for decoding. The method may include rendering, by the web server, the webpage with the stateless web element including a decoded version of the encoded data. The method may include transmitting, to the user device, instructions for a rendered version of the webpage.

Some implementations described herein relate to a non-transitory computer-readable medium that stores a set of instructions for using stateless web elements. The set of instructions, when executed by one or more processors of a device, may cause the device to receive, from a web host, code associated with a webpage. The set of instructions, when executed by one or more processors of the device, may cause the device to perform, using a host application, at least one call to an API function on behalf of a stateless web element in the webpage. The set of instructions, when executed by one or more processors of the device, may cause the device to receive, in response to the at least one call to the API function, encoded data. The set of instructions, when executed by one or more processors of the device, may cause the device to pass the encoded data to the stateless web element for decoding. The set of instructions, when executed by one or more processors of the device, may cause the device to output a rendered webpage with the stateless web element including a decoded version of the encoded data.

BRIEF DESCRIPTION OF THE DRAWINGS

FIGS. 6-7 are flowcharts of example processes relating to using stateless web elements that decode data, in accordance with some embodiments of the present disclosure.

DETAILED DESCRIPTION

The following detailed description of example implementations refers to the accompanying drawings. The same reference numbers in different drawings may identify the same or similar elements.

Different webpages may obtain data from a same data source. For example, an aggregator webpage may request data from a same data source as a vendor webpage. However, each webpage may process the data differently, resulting in contradictory data on the different webpages. As a result, security is decreased because the data source cannot prevent abuse or misuse of the data by the webpages.

Additionally, each call to the data source may be processed separately. As a result, network overhead is increased, and power and processing resources are wasted at a device rendering the webpage.

Some implementations described herein enable stateless web elements in a webpage to decode or decrypt data from a data source. As a result, the data is more secure because a host application associated with the webpage is unable to tamper with the data. Moreover, the stateless web elements may apply native styles to the data and avoid using shadow document object model (DOM) rendering, which results in the webpage being rendered faster and with less memory overhead. Additionally, the host application may bundle API calls from the stateless web elements together. As a result, network overhead is decreased, and power and processing resources are conserved at a user device or a web server rendering the webpage.

FIGS. 1A-1F are diagrams of an example 100 associated with stateless web elements that decode or decrypt data. As shown in FIGS. 1A-1F, example 100 includes a user device, a web host, and a data source. These devices are described in more detail in connection with FIGS. 4 and 5.

Figure 1A:
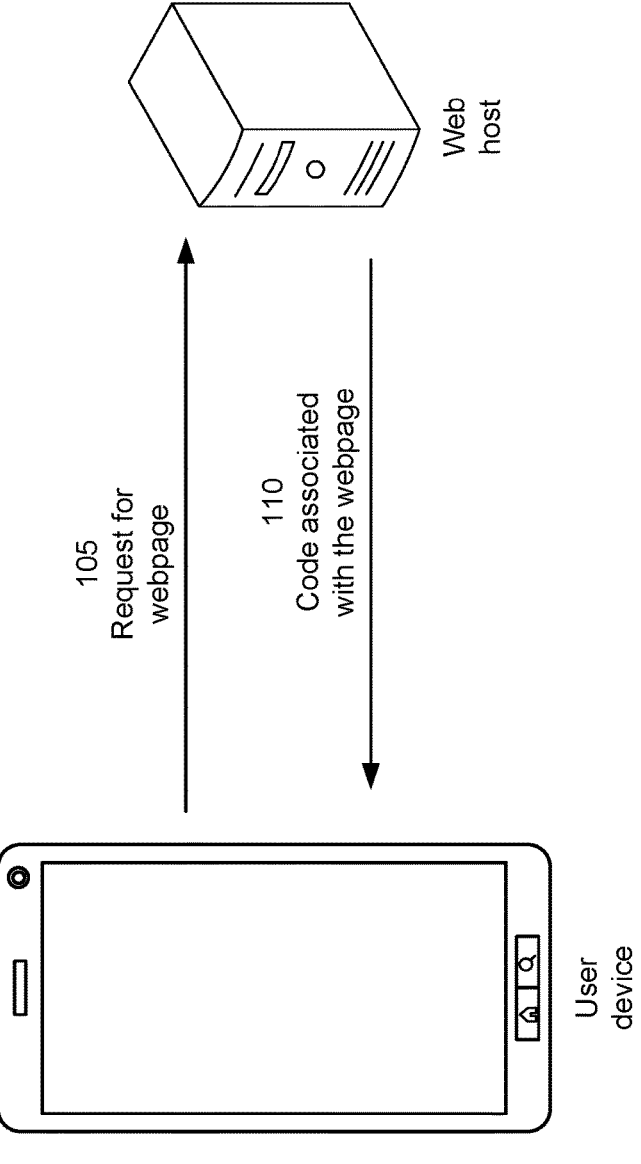
FIGS. 1A-1F are diagrams of an example implementation relating to stateless web elements that decode or decrypt data, in accordance with some embodiments of the present disclosure.

As shown in FIG. 1A and by reference number 105, the user device may transmit, and the web host may receive, a request for a webpage (e.g., at least one webpage). The request may include a hypertext transfer protocol (HTTP)

request. In some implementations, a user of the user device may provide input (e.g., via an input component of the user device) that triggers a web browser (or another similar type of application) to transmit the request. The input may indicate a uniform resource locator (URL). The web host may be associated with the URL. For example, the user device may resolve the URL (e.g., using a domain name service (DNS) or another type of service) such that the request is addressed to an Internet protocol (IP) address associated with the web host.

Although the example 100 is described in connection with the user device communicating directly with the web host, other examples may include an intermediary device (e.g., at least one intermediary device). For example, the user device may communicate with the web host via one or more network nodes and/or routers (e.g., via the Internet backbone, among other examples) rather than communicating directly.

As shown by reference number 110, the web host may transmit, and the user device may receive, code associated with the webpage. The web host may transmit, and the user device may receive, the code in response to the request from the user device. The code may include JavaScript® code or another type of executable code. Additionally, the code may include hypertext markup language (HTML) code, cascading style sheets (CSS) code, and/or a multimedia file (e.g., an image file and/or a video file), among other examples. Therefore, the user device may render (at least a portion) of the webpage. For example, style instructions (e.g., in an HTML file and/or a CSS file) may be processed along with any text and multimedia included in the code.

Figure 1B:
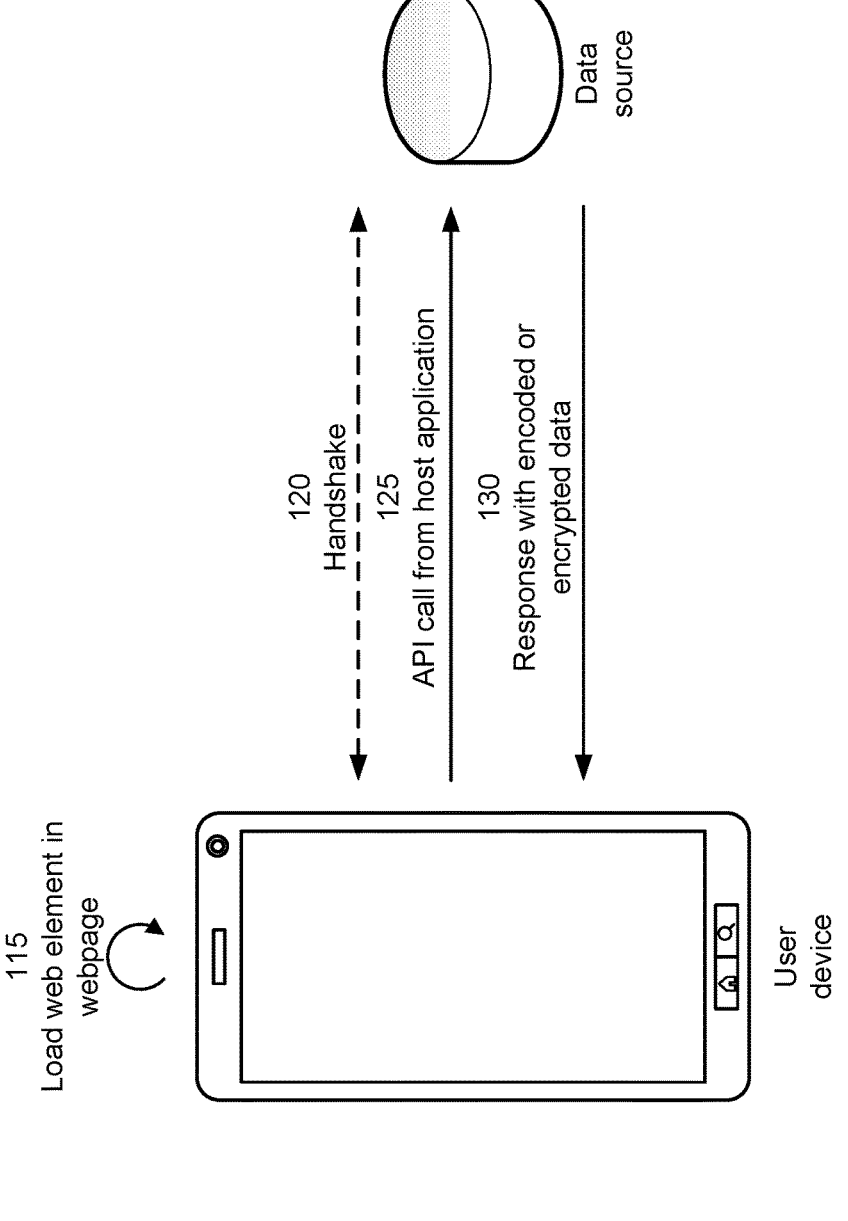

As shown in FIG. 1B and by reference number 115, the user device may load a stateless web element in the webpage using the code. As used herein, a web element may be referred to as "stateless" because the web element uses a communication protocol (e.g., with an API function associated with the data source, as described below) in which the web element refrains from maintaining a state (or a session state) associated with previous requests (e.g., previous calls to the API function). The "stateless" web elements are contrasted with "stateful" web elements (e.g., resources constructed according to representational state transfer (REST) constraints and/or another type of stateful architecture). Because the web element is stateless, a portion of the code associated with the web element is smaller than if the web element were stateful. As a result, network overhead in transferring the code from the web host to the user device is reduced.

The stateless web element may communicate with the data source through a host application associated with the webpage. However, in some implementations and as shown by reference number 120, the stateless web element may perform a handshake with an API function (e.g., provisioned by, or at least associated with, the data source). As used herein, "handshake" may refer to a sequence of messages between two or more devices to establish rules for communication. The rules may include a protocol agreement, a communication link, and/or an encryption protocol, among other examples. In some implementations, the stateless web element may perform the handshake in order to establish a shared secret. The shared secret may include a private key, a certificate, a signature, and/or another type of information intended to be available only to the API function and to the stateless web element.

Additionally, or alternatively, the stateless web element may include a decoding function associated with the API function. For example, the portion of the code associated with the stateless web element may define the decoding function. Therefore, in some implementations, the stateless web element may refrain from performing the handshake.

As shown by reference number 125, the user device may perform a call (e.g., at least one call) to the API function on behalf of the stateless web element. For example, the stateless web element may generate a request to the host application associated with the webpage, and the host application may trigger the user device to perform the call to the API function based on the request. The host application may bundle the call to the API function with additional calls to additional API functions (e.g., triggered by other web elements and/or by the host application itself). As a result, network overhead is decreased, and the user device conserves power and processing resources by bundling calls.

As shown by reference number 130, the data source may transmit, and the user device may receive, a response to the call to the API function. The response may include encoded data (e.g., encoded so that an algorithm hard-coded into the stateless web element may generate decoded data from the encoded data). Additionally, or alternatively, the response may include encrypted data (e.g., encrypted so that the stateless web element may generate decrypted data from encrypted data using the shared secret). The response may include an object. For example, the response may include a JavaScript object notation (JSON) data structure or another type of object that includes a plurality of elements. Therefore, the stateless web element may use a portion of the elements in the object or may use all elements in the object.

In some implementations, the webpage may include a plurality of stateless web elements. Accordingly, each stateless web element in the webpage may trigger a call to an API function from the user device. In other words, the user device may perform a call (e.g., at least one call) for each request from one of the stateless web elements. Alternatively, one stateless web element in the webpage may request a call to an API function on behalf of two or more stateless web elements in the webpage. Accordingly, the user device may perform fewer calls than a quantity of stateless web elements on the webpage.

Figure 1C:
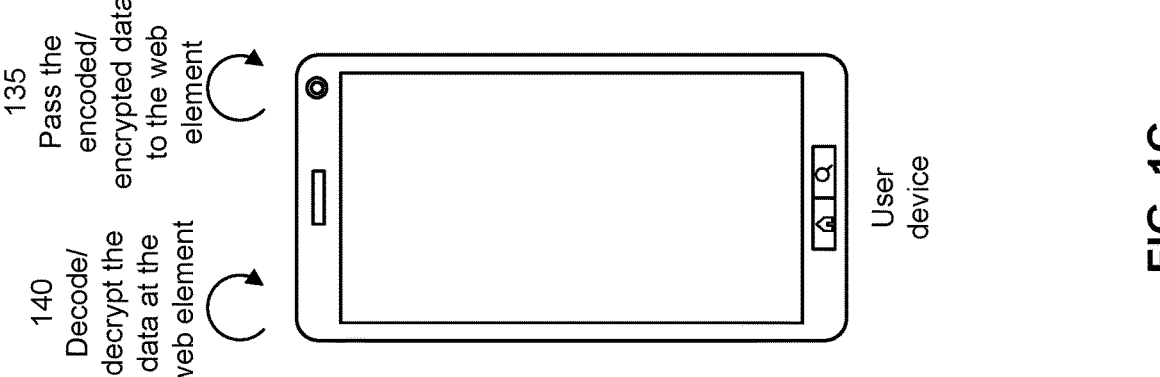
Figure 1C:

As shown in FIG. 1C and by reference number 135, the user device may pass the encoded data (and/or the encrypted data) of the response to the stateless web element. For example, the host application may pass the object of the response to the stateless web element. Therefore, the stateless web element may determine whether the host application tampered with (or otherwise modified) the response. For example, the stateless web element may explicitly detect tampering based on input from the host application failing to satisfy a data type condition (e.g., the host application passes an integer when a decimal is expected, among other examples). Additionally, or alternatively, the stateless web element may implicitly detect tampering based on input from the host application failing to decode and/or decrypt (e.g., as described below in connection with reference number 140). Accordingly, the stateless web element may reject the input from the host application based on the input failing to satisfy the data type condition and/or based on the input failing to decode and/or decrypt.

As shown by reference number 140, the stateless web element may decode and/or decrypt data received from the host application (e.g., the object received from the host application). For example, the stateless web element may generate a decrypted version of the encrypted data using the shared secret. Additionally, or alternatively, the stateless web element may generate a decoded version of the encoded data (e.g., using the decoding function associated with the API function).

Figure 1D:
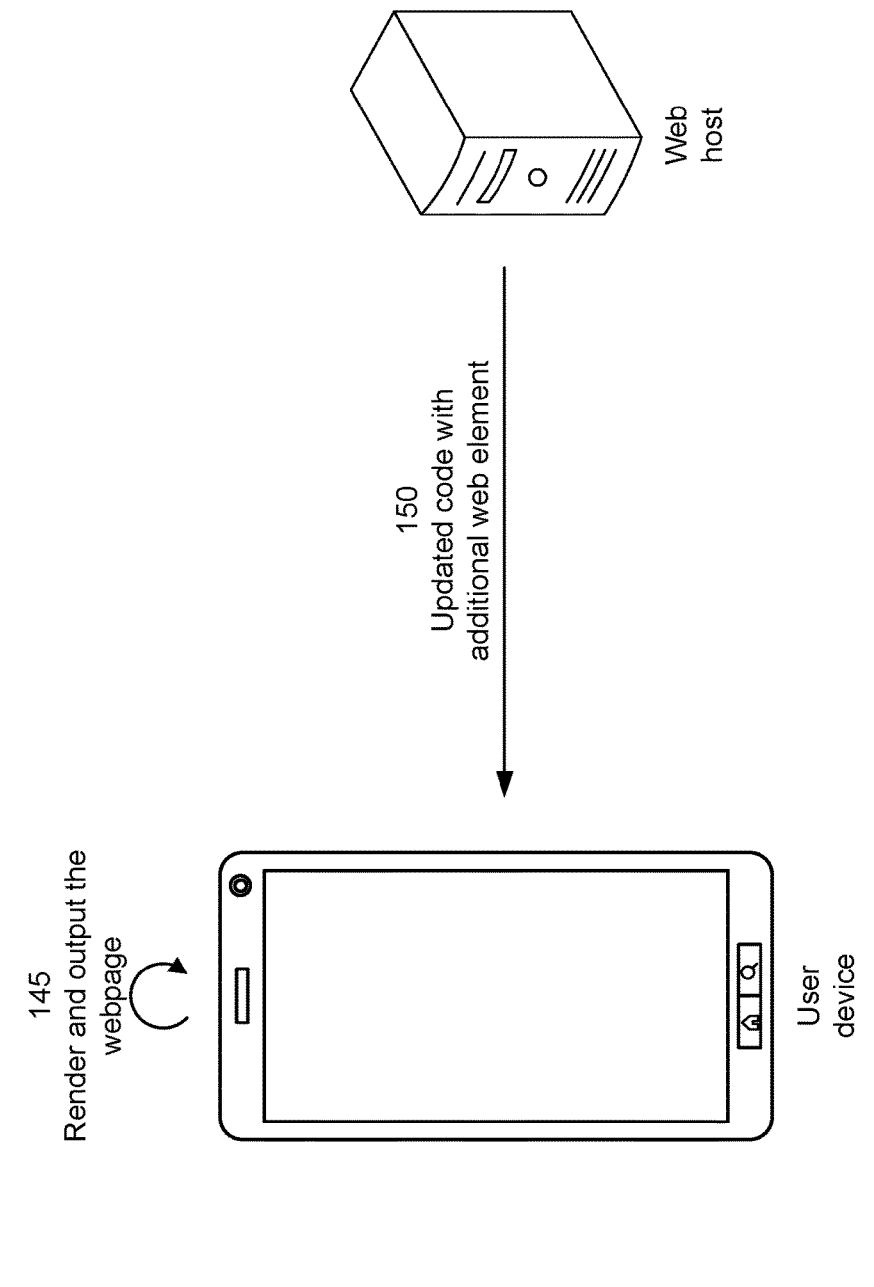

As shown in FIG. 1D and by reference number 145, the user device may render the webpage including the stateless web element. For example, the user device may generate a rendered webpage that includes the stateless web element, and the stateless web element may include the decrypted version of the encrypted data (and/or the decoded version of the encoded data). The web browser executed by the user device may generate instructions to display the stateless web element based on the code, and the stateless web element may include content based on the response (e.g., based on decoding and/or decrypting the input from the host application).

The user device may render the stateless web element according to a style of the stateless web element. Because the stateless web element applies a native styling to the decoded data and/or the decrypted data, the user device conserves power and processing resources that otherwise would have been spent using shadow DOM rendering for each instance.

As further shown by reference number 145, the user device may output the rendered webpage to the user. For example, the user device may use an output component of the user device to output the rendered webpage (e.g., by transmitting instructions for the rendered webpage to the output component).

Figure 1E:
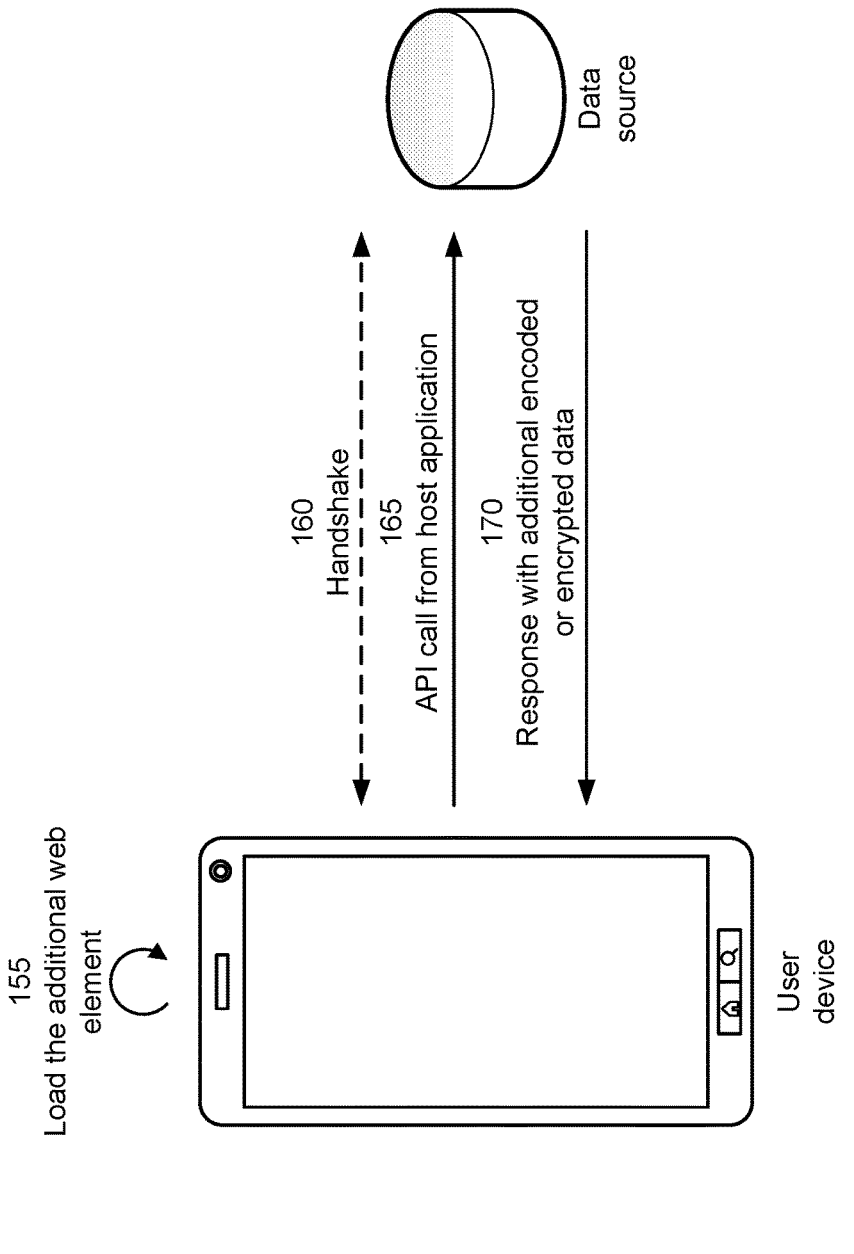

In some implementations, updates to the webpage may be rendered. For example, as shown by reference number 150, the web host may transmit, and the user device may receive, updated code associated with the webpage. The web host may transmit, and the user device may receive, the updated code in response to a request from the user device or in response to determining that the webpage has been updated. The updated code may define an additional stateless web element. Accordingly, as shown in FIG. 1E and by reference number 155, the user device may load the additional stateless web element. As shown by reference number 160, the additional stateless web element may perform a handshake with an additional API function (e.g., provisioned by, or at least associated with, the data source). The additional API function used by the additional stateless web element may be the same API function as used by the stateless web element or a different API function. Additionally, or alternatively, the additional stateless web element may establish the same shared secret as used by the stateless web element or may establish a different shared secret. Additionally, or alternatively, the additional stateless web element may include a decoding function. Therefore, in some implementations, the additional stateless web element may refrain from performing the handshake.

Figure 1F:
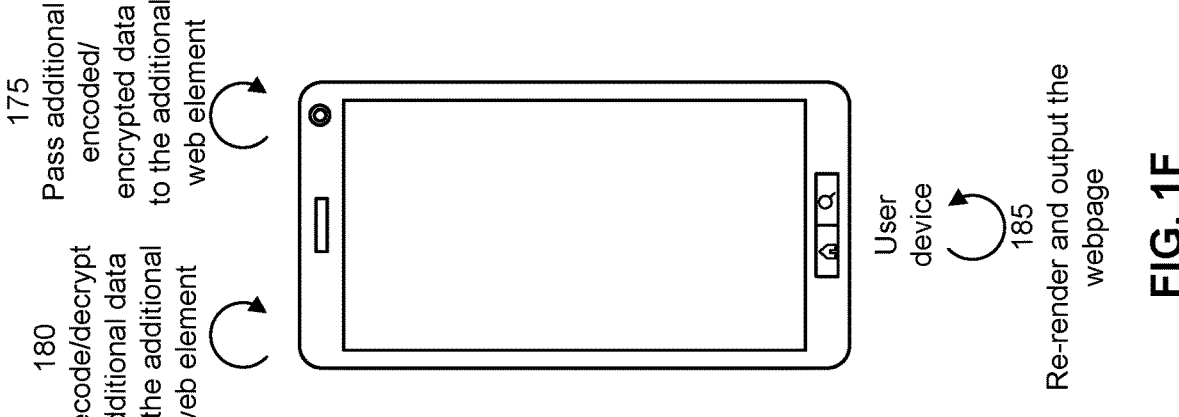

As shown by reference number 165, the user device may perform an additional call (e.g., at least one additional call) to the additional API function on behalf of the additional stateless web element. Therefore, as shown by reference number 170, the data source may transmit, and the user device may receive, an additional response to the additional call to the additional API function. The additional response may include additional encrypted data and/or additional encoded data. As shown in FIG. 1F and by reference number 175, the user device may pass the additional encoded data (and/or the additional encrypted data) of the additional response to the additional stateless web element. As shown by reference number 180, the additional stateless web element may decode and/or decrypt data received from the host application (e.g., the additional response received from the host application). For example, the additional stateless web element may generate a decrypted version of the additional encrypted data and/or a decoded version of the additional encoded data. As shown by reference number 185, the user device may re-render the webpage including the additional stateless web element and may output the re-rendered webpage to the user.

The shared secret used by the stateless web element (and/or used by the additional stateless web element) may lack persistence. For example, the stateless web element may discard the shared secret after decrypting the encrypted data from the API function. Alternatively, the shared secret used by the stateless web element (and/or used by the additional stateless web element) may be persistent. For example, the stateless web element may discard the shared secret in response to termination of a session by the host application. Alternatively, the stateless web element may use the shared secret across multiple sessions (e.g., until an expiry threshold associated with the shared secret is satisfied, whether the expiry threshold is use-based and/or time-based).

By using techniques as described in connection with FIGS. 1A-1F, the stateless web element in the webpage may decode and/or decrypt data received from the data source via the host application. As a result, the data is more secure because the stateless web element may detect when the host application tampers with the data. Moreover, the stateless web element may apply a native style to the data and avoid using shadow DOM rendering, which results in the webpage being rendered faster and with less memory overhead. Additionally, the host application may bundle the call to the API function, triggered by the stateless web element, with other calls. As a result, network overhead is decreased, and power and processing resources are conserved at the user device.

As indicated above, FIGS. 1A-1F are provided as an example. Other examples may differ from what is described with regard to FIGS. 1A-1F.

FIGS. 2A-2H are diagrams of an example 200 associated with stateless web elements that decode or decrypt data. As shown in FIGS. 2A-2H, example 200 includes a user device, a web server, a web host, and a data source. These devices are described in more detail in connection with FIGS. 4 and 5.

Figure 2A:
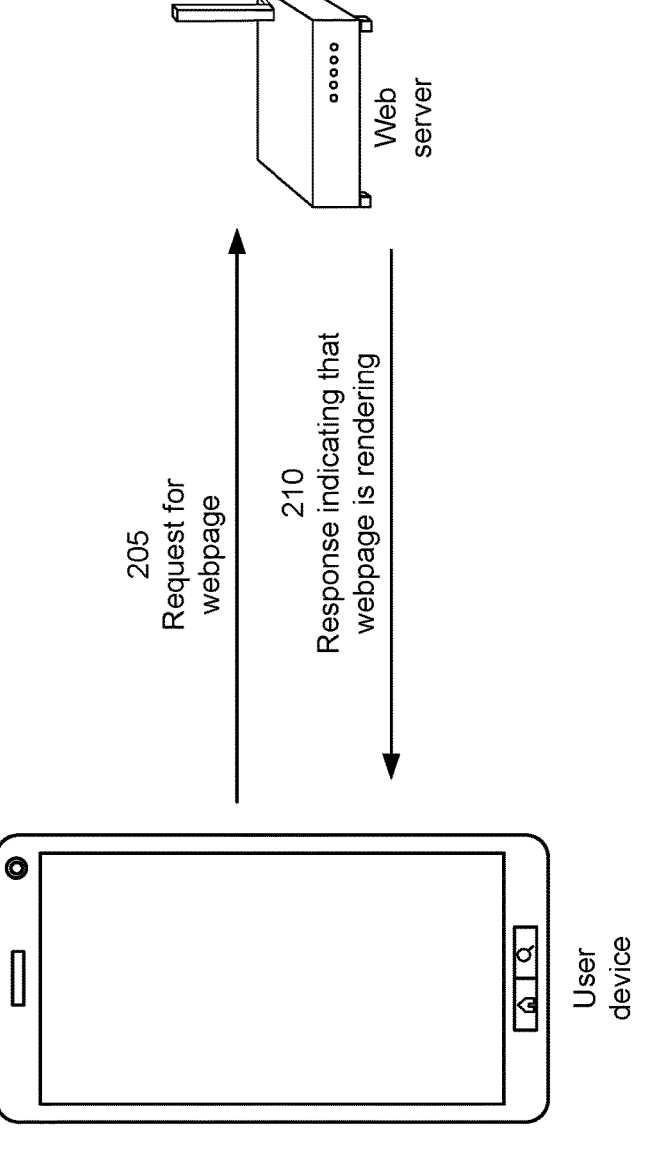
FIGS. 2A-2H are diagrams of an example implementation relating to stateless web elements that decode or decrypt data, in accordance with some embodiments of the present disclosure.

As shown in FIG. 2A and by reference number 205, the user device may transmit, and the web server may receive, a request for a webpage (e.g., at least one webpage). The request may include an HTTP request. In some implementations, a user of the user device may provide input (e.g., via an input component of the user device) that triggers a web browser (or another similar type of application) to transmit the request. The input may indicate a URL. The web server may be associated with the URL. For example, the user device may resolve the URL (e.g., using a DNS or another type of service) such that the request is addressed to an IP address associated with the web server.

Although the example 100 is described in connection with the user device communicating directly with the web server, other examples may include an intermediary device (e.g., at least one intermediary device). For example, the user device may communicate with the web server via one or more network nodes and/or routers (e.g., via the Internet backbone, among other examples) rather than communicating directly.

As shown by reference number 210, the web server may transmit, and the user device may receive, a response indicating that the webpage is rendering. For example, the web server may render the webpage and provide the rendered webpage to the user device for output (e.g., as described in connection with FIG. 2E). Therefore, the user device may output (e.g., using an output component of the user device) a loading screen, an hourglass icon, and/or another indicator of loading based on the response indicating that the webpage is rendering.

Figure 2B:
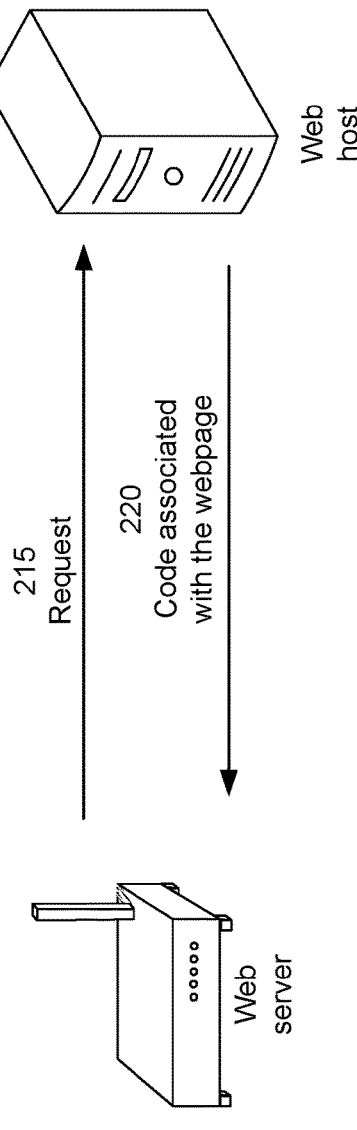

As shown in FIG. 2B and by reference number 215, the web server may transmit, and the web host may receive, a request for the webpage. The request may include an HTTP request. In some implementations, the web server may forward the request from the user device directly to the web host. Alternatively, the web server may decode the request from the user device and generate a new request to the web host based on information decoded from the user device's request.

As shown by reference number 220, the web host may transmit, and the web server may receive, code associated with the webpage. The web host may transmit, and the web server may receive, the code in response to the request from the web server. The code may include JavaScript code or another type of executable code. Additionally, the code may include HTML code, CSS code, and/or a multimedia file (e.g., an image file and/or a video file), among other examples. Therefore, the web server may render (at least a portion) of the webpage. For example, style instructions (e.g., in an HTML file and/or a CSS file) may be processed along with any text and multimedia included in the code.

Figure 2C:
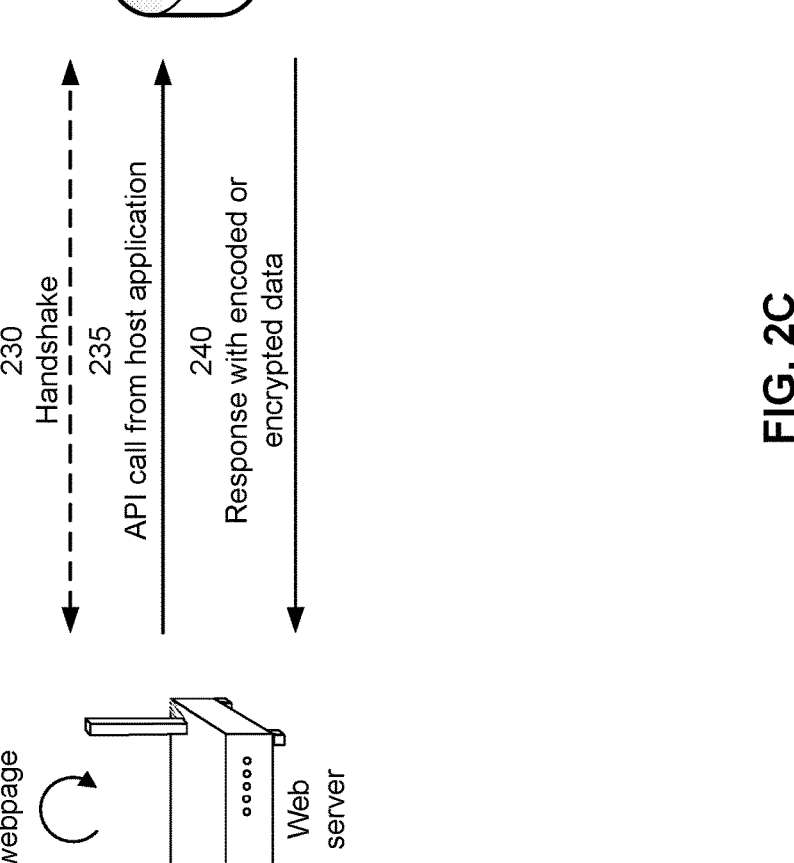

As shown in FIG. 2C and by reference number 225, the web server may load a stateless web element in the webpage using the code. Because the web element is stateless, a portion of the code associated with the web element is smaller than if the web element were stateful. As a result, network overhead in transferring the code from the web host to the user device is reduced.

The stateless web element may communicate with the data source through a host application associated with the webpage. However, in some implementations and as shown by reference number 230, the stateless web element may perform a handshake with an API function (e.g., provisioned by, or at least associated with, the data source). In some implementations, the stateless web element may perform the handshake in order to establish a shared secret. The shared secret may include a private key, a certificate, a signature, and/or another type of information intended to be available only to the API function and to the stateless web element.

Additionally, or alternatively, the stateless web element may include a decoding function associated with the API function. For example, the portion of the code associated with the stateless web element may define the decoding function. Therefore, in some implementations, the stateless web element may refrain from performing the handshake.

As shown by reference number 235, the web server may perform a call (e.g., at least one call) to the API function on behalf of the stateless web element. For example, the stateless web element may generate a request to the host application associated with the webpage, and the host application may trigger the web server to perform the call to the API function based on the request. The host application may bundle the call to the API function with additional calls to additional API functions (e.g., triggered by other web elements and/or by the host application itself). As a result, network overhead is decreased, and the web server conserves power and processing resources by bundling calls.

As shown by reference number 240, the data source may transmit, and the web server may receive, a response to the call to the API function. The response may include encoded data (e.g., encoded so that an algorithm hard-coded into the stateless web element may generate decoded data from the encoded data). Additionally, or alternatively, the response may include encrypted data (e.g., encrypted so that the stateless web element may generate decrypted data from the encrypted data using the shared secret). The response may include an object. For example, the response may include a JSON data structure or another type of object that includes a plurality of elements. Therefore, the stateless web element may use a portion of the elements in the object or may use all elements in the object.

In some implementations, the webpage may include a plurality of stateless web elements. Accordingly, each stateless web element in the webpage may trigger a call to an API function from the web server. In other words, the web server may perform a call (e.g., at least one call) for each request from one of the stateless web elements. Alternatively, one stateless web element in the webpage may request a call to an API function on behalf of two or more stateless web elements in the webpage. Accordingly, the web server may perform fewer calls than a quantity of stateless web elements on the webpage.

Figure 2D:
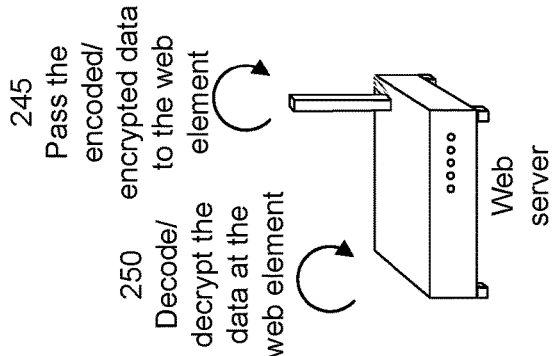

As shown in FIG. 2D and by reference number 245, the web server may pass the encoded data (and/or the encrypted data) of the response to the stateless web element. For example, the host application may pass the object of the response to the stateless web element. Therefore, the stateless web element may determine whether the host application tampered with (or otherwise modified) the response. For example, the stateless web element may explicitly detect tampering based on input from the host application failing to satisfy a data type condition (e.g., the host application passes an integer when a decimal is expected, among other examples). Additionally, or alternatively, the stateless web element may implicitly detect tampering based on input from the host application failing to decode and/or decrypt (e.g., as described below in connection with reference number 250). Accordingly, the stateless web element may reject the input from the host application based on the input failing to satisfy the data type condition and/or based on the input failing to decode and/or decrypt.

As shown by reference number 250, the stateless web element may decode and/or decrypt data received from the host application (e.g., the object received from the host application). For example, the stateless web element may generate a decrypted version of the encrypted data using the shared secret. Additionally, or alternatively, the stateless web element may generate a decoded version of the encoded data (e.g., using the decoding function associated with the API function).

The web server may render the webpage including the stateless web element. For example, the web server may generate a rendered webpage that includes the stateless web element, and the stateless web element may include the decrypted version of the encrypted data (and/or the decoded version of the encoded data). The web server may generate HTML code based on rendering the stateless web element that includes content based on the response (e.g., based on elements in the decrypted version of the encrypted data and/or the decoded version of the encoded data).

The web server may render the stateless web element according to a style of the stateless web element. Because the stateless web element applies a native styling to the decoded data and/or the decrypted data, the web server conserves power and processing resources that otherwise would have been spent using shadow DOM rendering for each instance.

Figure 2E:
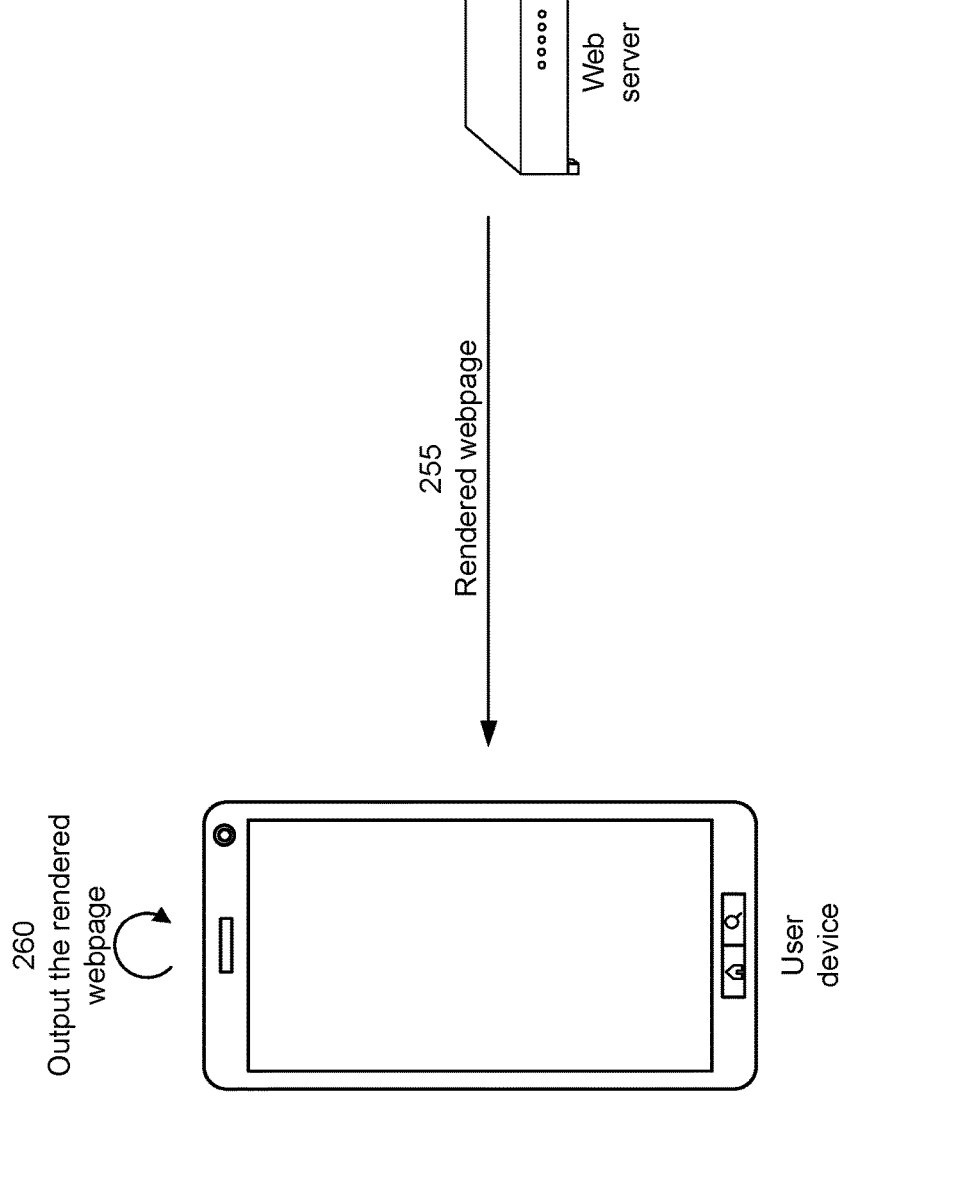

As shown in FIG. 2E and by reference number 255, the web server may transmit, and the user device may receive, instructions for a rendered version of the webpage including the stateless web element. As shown by reference number 260, the user device may output the rendered version of the webpage to the user. For example, the user device may use an output component of the user device to output the rendered version of the webpage (e.g., by transmitting instructions for the rendered version to the output component).

Figure 2F:
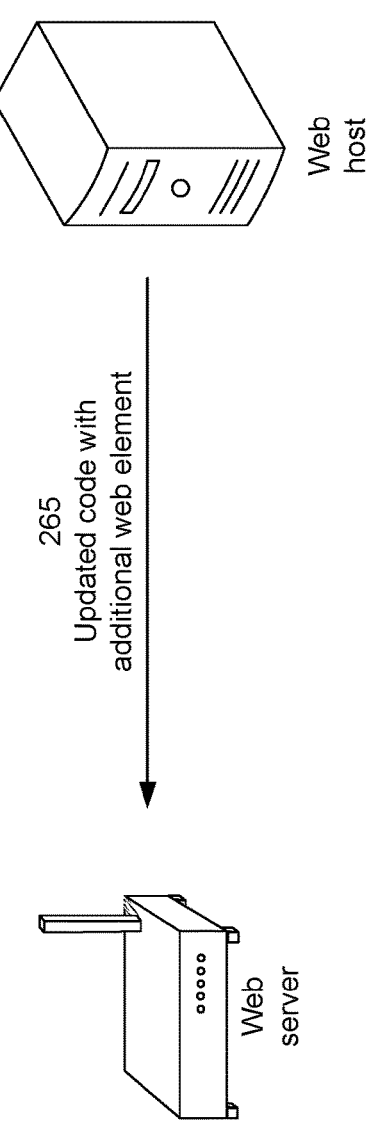
Figure 2G:
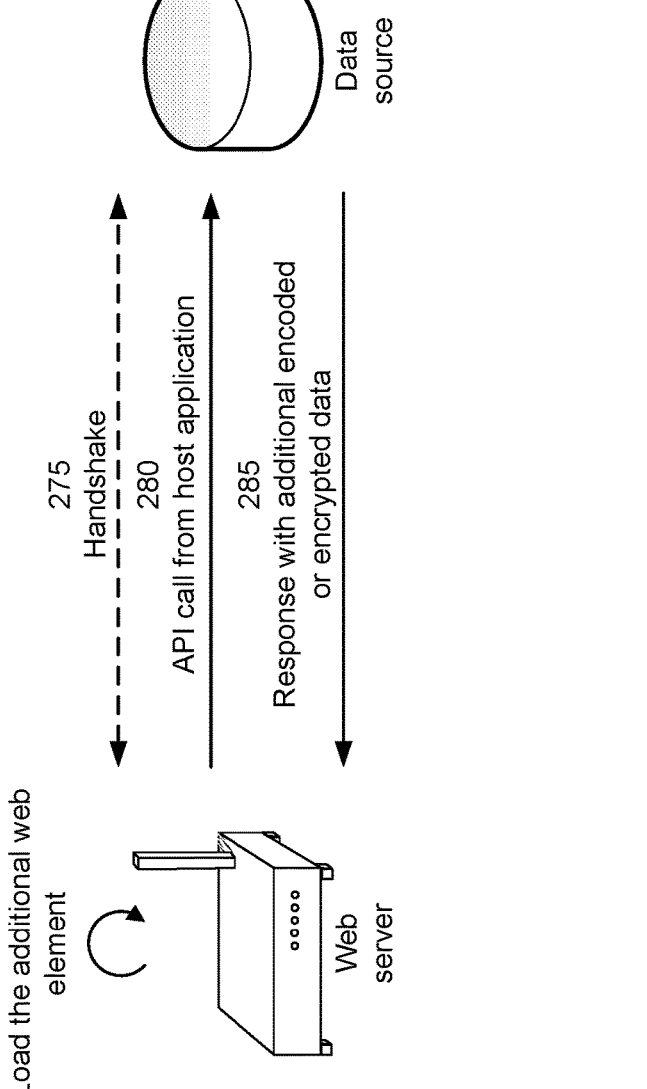

In some implementations, updates to the webpage may be rendered. For example, as shown in FIG. 2F and by reference number 265, the web host may transmit, and the web server may receive, updated code associated with the webpage. The web host may transmit, and the web server may receive, the updated code in response to a request from the web server or in response to determining that the webpage has been updated. The updated code may define an additional stateless web element. Accordingly, as shown in FIG. 2G and by reference number 270, the web server may load the additional stateless web element. As shown by reference number 275, the additional stateless web element may perform a handshake with an additional API function (e.g., provisioned by, or at least associated with, the data source). The additional API function used by the additional stateless web element may be the same API function as used by the stateless web element or a different API function. Additionally, or alternatively, the additional stateless web element may establish the same shared secret as used by the stateless web element or may establish a different shared secret. Additionally, or alternatively, the additional stateless web element may include a decoding function. Therefore, in some implementations, the additional stateless web element may refrain from performing the handshake.

Figure 2H:
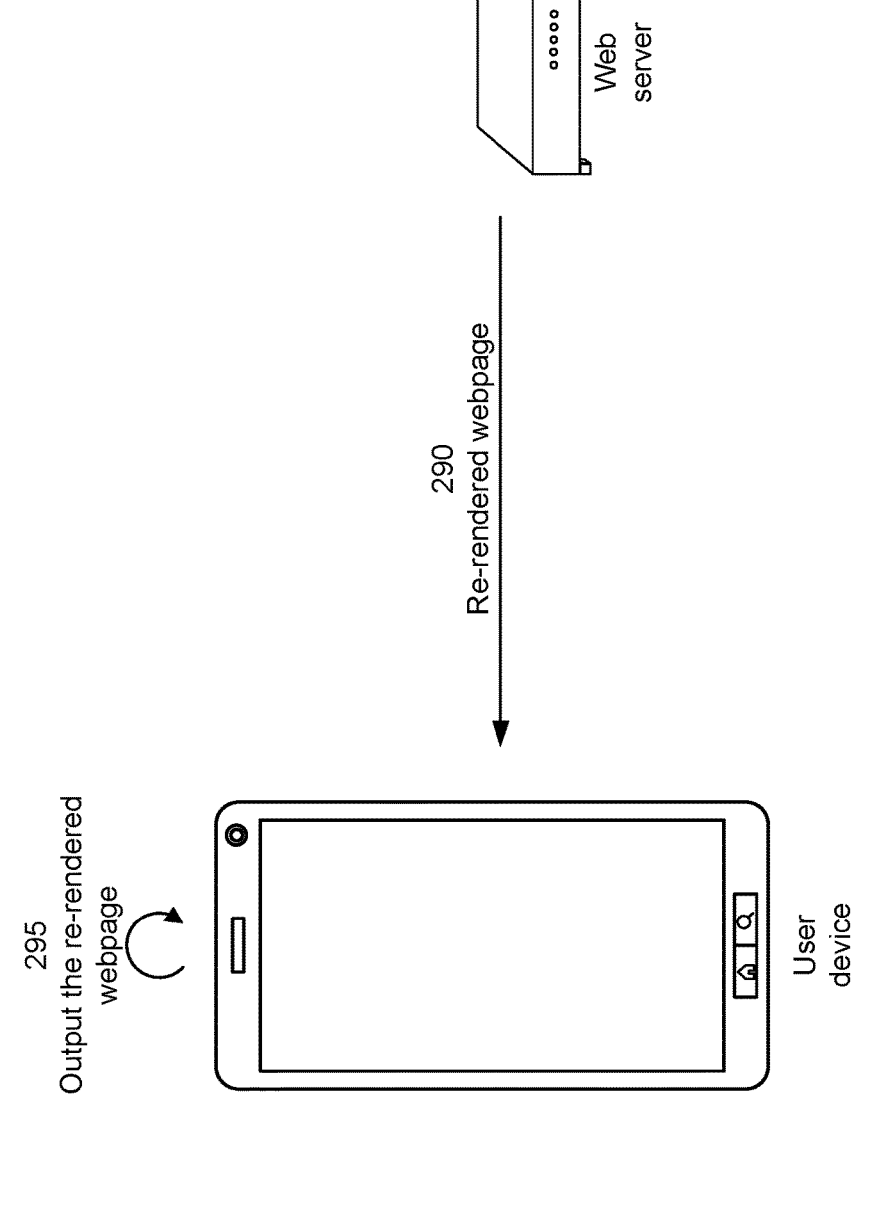

As shown by reference number 280, the web server may perform an additional call (e.g., at least one additional call) to the additional API function on behalf of the additional stateless web element. Therefore, as shown by reference number 285, the data source may transmit, and the web server may receive, an additional response to the additional call to the additional API function. The additional response may include additional encrypted data and/or additional encoded data. The web server may pass the additional encoded data (and/or the additional encrypted data) of the additional response to the additional stateless web element, and the additional stateless web element may decode and/or decrypt data received from the host application (e.g., the additional response received from the host application). For example, the additional stateless web element may generate a decrypted version of the additional encrypted data and/or a decoded version of the additional encoded data. The web server may re-render the webpage including the additional stateless web element. As shown in FIG. 2H and by reference number 290, the web server may transmit, and the user device may receive, instructions for a re-rendered version of the webpage including the additional stateless web element. As shown by reference number 295, the user device may output the re-rendered version of the webpage to the user (e.g., using an output component of the user device).

The shared secret used by the stateless web element (and/or used by the additional stateless web element) may lack persistence. For example, the stateless web element may discard the shared secret after decrypting the encrypted data from the API function. Alternatively, the shared secret used by the stateless web element (and/or used by the additional stateless web element) may be persistent. For example, the stateless web element may discard the shared secret in response to termination of a session by the host application. Alternatively, the stateless web element may use the shared secret across multiple sessions (e.g., until an expiry threshold associated with the shared secret is satisfied, whether the expiry threshold is use-based and/or time-based).

By using techniques as described in connection with FIGS. 2A-2H, the stateless web element in the webpage may decode and/or decrypt data received from the data source via the host application. As a result, the data is more secure because the host application is unable to tamper with the data without detection by the stateless web element. Moreover, the stateless web element may apply a native style to the data and avoid using shadow DOM rendering, which results in the webpage being rendered faster and with less memory overhead. Additionally, the host application may bundle the call to the API function, triggered by the stateless web element, with other calls. As a result, network overhead is decreased, and power and processing resources are conserved at the web server.

As indicated above, FIGS. 2A-2H are provided as an example. Other examples may differ from what is described with regard to FIGS. 2A-2H.

Figure 3:
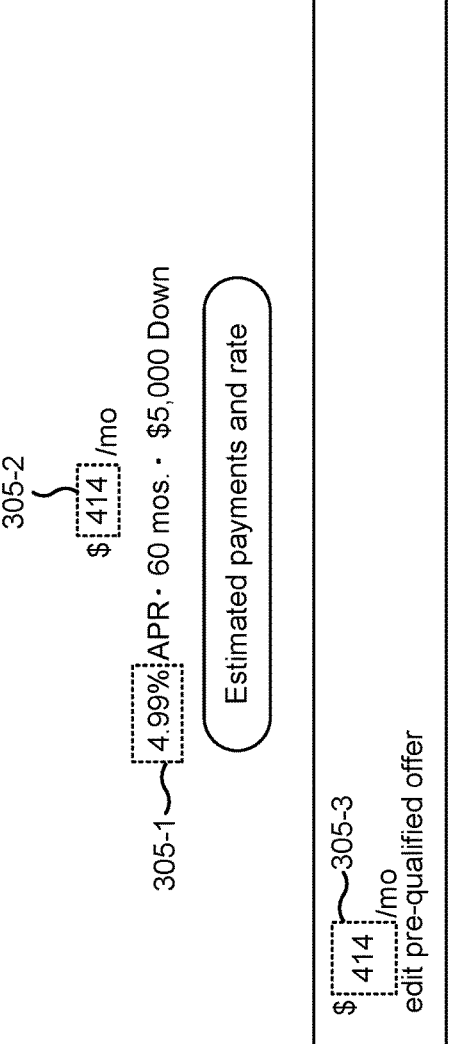
FIG. 3 is a diagram of an example webpage that includes stateless web elements, in accordance with some embodiments of the present disclosure.
Figure 3:
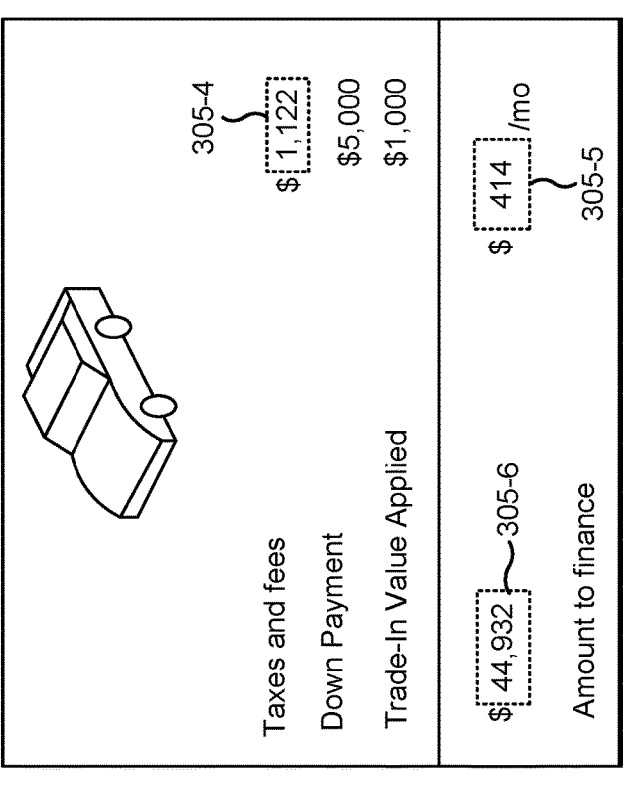

FIG. 3 is a diagram of an example webpage 300 that includes stateless web elements. The example webpage 300 may be output by a user device, which is described in more detail in connection with FIGS. 4 and 5.

A webpage may include a plurality of web elements. For example, the webpage may include web element 305-1, web element 305-2, web element 305-3, web element 305-4, web element 305-5, and web element 305-6. As shown in FIG. 3, the web element 305-1 performs an API call and decodes or decrypts a variable included in a response to the API call. Accordingly, content of the web element 305-1 is secure from a host application associated with the webpage. Additionally, the web elements 305-2 and 305-3 similarly perform API calls and decode or decrypt variables included in responses to the API calls.

As further shown in FIG. 3, the web element 305-4 performs an API call and decodes or decrypts a variable included in a response to the API call, the web element 305-5 performs an API call and decodes or decrypts a variable included in a response to the API call, and the web element 305-6 performs an API call and decodes or decrypts a variable included in a response to the API call. Because the responses are all encoded or encrypted, the host application may bundle the API calls to conserve network overhead while being unable to modify the variables in the responses. Although the example webpage 300 is described with a one-to-one relationship between API calls and web elements, other examples may include an API call (e.g., at least one API call) that corresponds to multiple web elements.

As indicated above, FIG. 3 is provided as an example. Other examples may differ from what is described with regard to FIG. 3. For example, additional web elements (e.g., seven web elements, eight web elements, and so on) may be included in the webpage. Alternatively, fewer web elements (e.g., five web elements, four web elements, and so on) may be included in the webpage.

Figure 4:
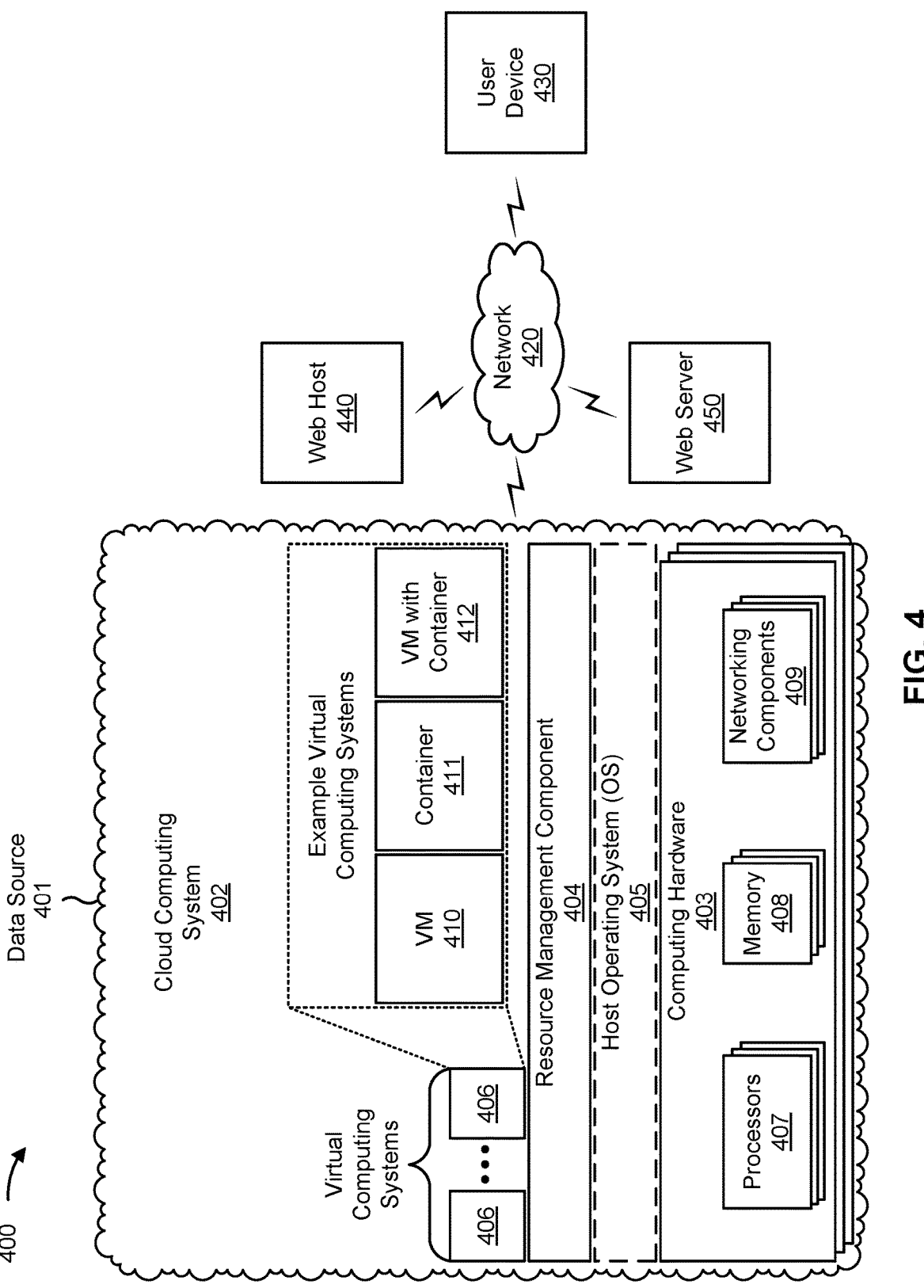
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a data source 401, which may include one or more elements of and/or may execute within a cloud computing system 402. The cloud computing system 402 may include one or more elements 403-412, as described in more detail below. As further shown in FIG. 4, environment 400 may include a network 420, a user device 430, a web host 440, and/or a web server 450. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the data source 401 may include one or more elements 403-412 of the cloud computing system 402, may execute within the cloud computing system 402, and/or may be hosted within the cloud computing system 402, in some implementations, the data source 401 may not be cloud-based (e.g., may be implemented outside of a cloud computing system) or may be partially cloud-based. For example, the data source 401 may include one or more devices that are not part of the cloud computing system 402, such as device 500 of FIG. 5, which may include a standalone server or another type of computing device. The data source 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user device 430 may include one or more devices capable of receiving, generating, storing, processing, and/or providing information associated with webpages, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 430 may communicate with one or more other devices of environment 400, as described elsewhere herein.

The web host 440 may include one or more devices capable of receiving, generating, storing, processing, and/or providing code associated with webpages, as described elsewhere herein. The web host 440 may include a communication device and/or a computing device. For example, the web host 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The web host 440 may communicate with one or more other devices of environment 400, as described elsewhere herein.

The web server 450 may include one or more devices capable of receiving, generating, storing, processing, providing, and/or routing information associated with rendered webpages, as described elsewhere herein. The web server 450 may include a communication device and/or a computing device. For example, the web server 450 may include a server, such as an application server, a client server, a web server, a database server, a host server, a proxy server, a virtual server (e.g., executing on computing hardware), or a server in a cloud computing system. In some implementations, the web server 450 may include computing hardware used in a cloud computing environment. The web server 450 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
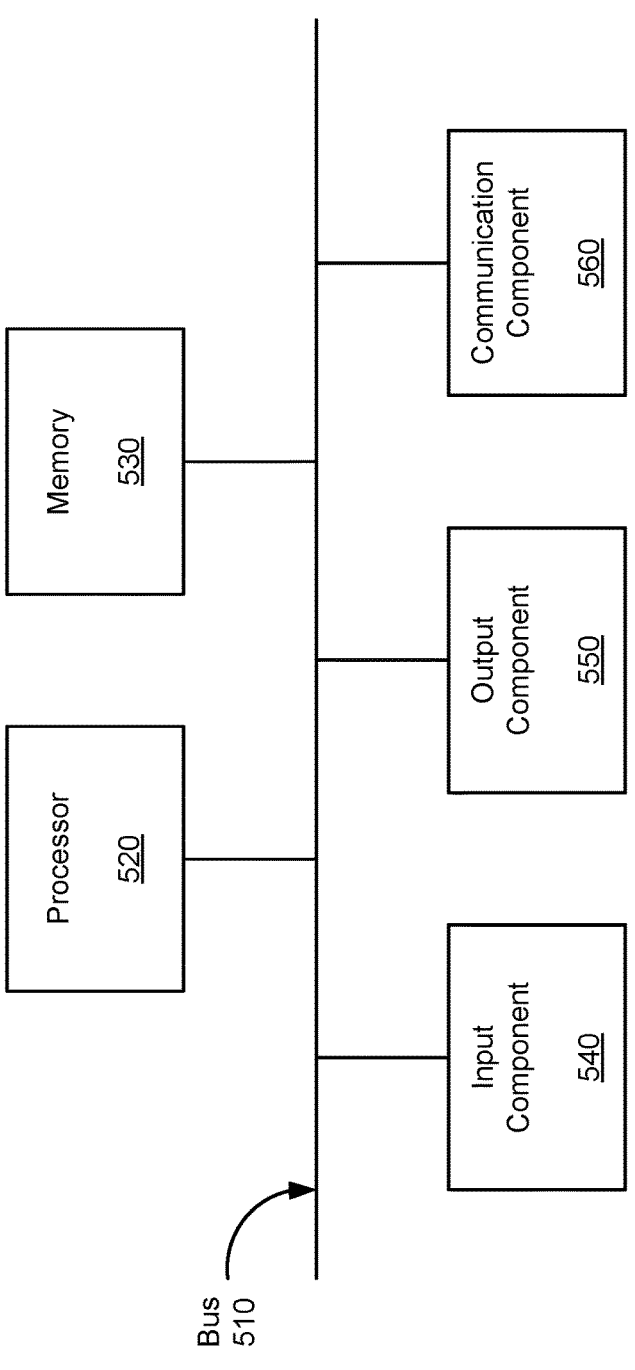
FIG. 5 is a diagram of example components of one or more devices of FIG. 4, in accordance with some embodiments of the present disclosure.

FIG. 5 is a diagram of example components of a device 500 associated with stateless web elements that decode or decrypt data. The device 500 may correspond to a user device 430, a web host 440, and/or a web server 450. In some implementations, a user device 430, a web host 440, and/or a web server 450 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with using stateless web elements that decode data. In some implementations, one or more process blocks of FIG. 6 may be performed by a web server 450. In some implementations, one or more process blocks of FIG. 6 may be performed by another device or a group of devices separate from or including the web server 450, such as a data source 401, a user device 430, and/or a web host 440. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, from a user device, a request to access a webpage (block 610). For example, the web server 450 (e.g., using processor 520, memory 530, and/or communication component 560) may receive, from a user device, a request to access a webpage, as described above in connection with reference number 205 of FIG. 2A. As an example, the web server 450 may receive, from the user device, a request for the webpage. The request may include an HTTP request. In some implementations, the request may be associated with a URL that is also associated with the web server 450.

As further shown in FIG. 6, process 600 may include performing, using a host application, at least one call to an API function on behalf of a stateless web element in the webpage (block 620). For example, the web server 450 (e.g., using processor 520, memory 530, and/or communication component 560) may perform, using a host application, at least one call to an API function on behalf of a stateless web element in the webpage, as described above in connection with reference number 235 of FIG. 2C. As an example, the stateless web element may generate a request to the host application associated with the webpage, and the host application may trigger the web server 450 to perform the call to the API function based on the request. The host application may bundle the call to the API function with additional calls to additional API functions (e.g., triggered by other web elements and/or by the host application itself).

As further shown in FIG. 6, process 600 may include receiving, at the host application and in response to the at least one call to the API function, encoded data (block 630). For example, the web server 450 (e.g., using processor 520, memory 530, and/or communication component 560) may receive, at the host application and in response to the at least one call to the API function, encoded data, as described above in connection with reference number 240 of FIG. 2C. As an example, the encoded data may be at least one object that includes a plurality of elements. Other examples may include encrypted data in addition to, or in lieu of, the encoded data.

As further shown in FIG. 6, process 600 may include passing the encoded data from the host application to the stateless web element for decoding (block 640). For example, the web server 450 (e.g., using processor 520 and/or memory 530) may pass the encoded data from the host application to the stateless web element for decoding, as described above in connection with reference number 245 of FIG. 2D. As an example, the host application may pass a response from the API function, including the encoded data, to the stateless web element. Therefore, the stateless web element may determine whether the host application tampered with (or otherwise modified) the response. For example, the stateless web element may explicitly detect tampering and/or may implicitly detect tampering.

As further shown in FIG. 6, process 600 may include rendering the webpage with the stateless web element including a decoded version of the encoded data (block 650). For example, the web server 450 (e.g., using processor 520 and/or memory 530) may render the webpage with the stateless web element including a decoded version of the encoded data, as described above in connection with FIG. 2E. As an example, the web server 450 may generate instructions to display the stateless web element based on the code, and the stateless web element may include content based on the response from the API function (e.g., based on decoding and/or decrypting the input from the host application). The web server 450 may render the stateless web element according to a style of the stateless web element.

As further shown in FIG. 6, process 600 may include transmitting, to the user device, instructions for a rendered version of the webpage (block 660). For example, the web server 450 (e.g., using processor 520, memory 530, and/or communication component 560) may transmit, to the user device, instructions for a rendered version of the webpage, as described above in connection with reference number 255 of FIG. 2E. As an example, the web server 450 may transmit HTML code based on rendering the stateless web element that includes a decoded version of the encoded data (and/or a decrypted version of the encrypted data).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 2A-2H and/or FIG. 3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

FIG. 7 is a flowchart of an example process 700 associated with using stateless web elements that decode data. In some implementations, one or more process blocks of FIG. 7 may be performed by a user device 430. In some implementations, one or more process blocks of FIG. 7 may be performed by another device or a group of devices separate from or including the user device 430, such as a data source 401, a web host 440, and/or a web server 450. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include receiving, from a web host, code associated with a webpage (block 710). For example, the user device 430 (e.g., using processor 520, memory 530, and/or communication component 560) may receive, from a web host, code associated with a webpage, as described above in connection with reference number 110 of FIG. 1A. As an example, the user device 430 may transmit, to the web host, a request for the at least one webpage. The request may include an HTTP request. The user device 430 may receive, from the web host, the code associated with the at least one webpage in response to the request from the user device 430. The code may include JavaScript code or another type of executable code. Additionally, the code may include HTML code, CSS code, and/or a multimedia file (e.g., an image file and/or a video file), among other examples.

As further shown in FIG. 7, process 700 may include performing, using a host application, at least one call to an API function on behalf of a stateless web element in the webpage (block 720). For example, the user device 430 (e.g., using processor 520, memory 530, and/or communication component 560) may perform, using a host application, at least one call to an API function on behalf of a stateless web element in the webpage, as described above in connection with reference number 125 of FIG. 1B. As an example, the stateless web element may generate a request to the host application associated with the webpage, and the host application may trigger the user device 430 to perform the call to the API function based on the request. The host application may bundle the call to the API function with additional calls to additional API functions (e.g., triggered by other web elements and/or by the host application itself).

As further shown in FIG. 7, process 700 may include receiving, in response to the at least one call to the API function, encoded data (block 730). For example, the user device 430 (e.g., using processor 520, memory 530, and/or communication component 560) may receive, in response to the at least one call to the API function, encoded data, as described above in connection with reference number 130 of FIG. 1B. As an example, the encoded data may be at least one object that includes a plurality of elements. Other examples may include encrypted data in addition to, or in lieu of, the encoded data.

As further shown in FIG. 7, process 700 may include passing the encoded data to the stateless web element for decoding (block 740). For example, the user device 430 (e.g., using processor 520 and/or memory 530) may pass the encoded data to the stateless web element for decoding, as described above in connection with reference number 135 of FIG. 1C. As an example, the host application may pass a response from the API function, including the encoded data, to the stateless web element. Therefore, the stateless web element may determine whether the host application tampered with (or otherwise modified) the response. For example, the stateless web element may explicitly detect tampering and/or may implicitly detect tampering.

As further shown in FIG. 7, process 700 may include outputting a rendered webpage with the stateless web element including a decoded version of the encoded data (block 750). For example, the user device 430 (e.g., using processor 520, memory 530, and/or output component 550) may output a rendered webpage with the stateless web element including a decoded version of the encoded data, as described above in connection with reference number 145 of FIG. 1D. As an example, the user device 430 may generate instructions to display the stateless web element based on the code, and the stateless web element may include content based on the response from the API function (e.g., based on decoding and/or decrypting the input from the host application). The user device 430 may render the stateless web element according to a style of the stateless web element. The user device 430 may use an output component to output the rendered webpage visually and/or auditorily.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1F and/or FIG. 3. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using stateless web elements, the system comprising:

one or more memories; and one or more processors, communicatively coupled to the one or more memories, configured to:

receive, from a web host, code associated with a webpage;

perform a handshake between a stateless web element in the webpage and an application programming interface (API) function in order to establish a shared secret;

perform, using a host application, at least one call to the API function on behalf of the stateless web element;

receive, in response to the at least one call, encrypted data;

pass the encrypted data to the stateless web element for decryption using the shared secret;

perform an additional handshake between an additional stateless web element in the webpage and an additional API function in order to establish an additional shared secret;

perform, using the host application, at least one additional call to the additional API function on behalf of the additional stateless web element;

receive, in response to the at least one additional call, additional encrypted data;

pass the additional encrypted data to the additional stateless web element for decryption using the additional shared secret; and output a rendered webpage with the stateless web element including a decrypted version of the encrypted data, wherein the rendered webpage further includes the additional stateless web element with a decrypted version of the additional encrypted data.

2. The system of claim 1, wherein the at least one call to the API function is bundled with additional calls to additional API functions by the host application.

3. The system of claim 1, wherein the one or more processors are configured to:
discard the shared secret in response to termination of a session by the host application.

4. The system of claim 1, wherein the one or more processors are configured to:
reject, at the stateless web element, input from the host application based on the input failing to satisfy a data type condition.

5. The system of claim 1, wherein the one or more processors are configured to:
reject, at the stateless web element, input from the host application based on the input failing to decrypt.

6. The system of claim 1, wherein the stateless web element is configured to apply native styling to the decrypted version of the encrypted data and refrain from using shadow document object model rendering.

7. The system of claim 1, wherein the stateless web element is configured to detect tampering by the host application based on input from the host application failing to satisfy a data type condition or based on input from the host application failing to decode or decrypt.

8. The system of claim 1, wherein the shared secret is discarded after decryption of the encrypted data.

9. A method of using stateless web elements, comprising:

receiving, from a user device and at a web server, a request to access a webpage;

performing, using a host application executed by the web server, at least one call to an application programming interface (API) function on behalf of a stateless web element in the webpage;

receiving, at the host application and in response to the at least one call to the API function, encoded data;

passing the encoded data from the host application to the stateless web element for decoding;

rendering, by the web server, the webpage with the stateless web element including a decoded version of the encoded data;

performing, using the host application, at least one additional call to an additional API function on behalf of an additional stateless web element;

receiving, in response to the at least one additional call, additional encoded data;

passing the additional encoded data to the additional stateless web element for decoding; and transmitting, to the user device, instructions for a rendered version of the webpage, wherein the rendered version of the webpage includes the additional stateless web element with a decoded version of the additional encoded data.

10. The method of claim 9, wherein the at least one call to the API function is bundled with additional calls to additional API functions by the host application.

11. The method of claim 9, further comprising:

rejecting, at the stateless web element, input from the host application.

12. The method of claim 9, further comprising:

transmitting, to a web host, a request for the webpage; and receiving, from the web host, code associated with the webpage.

13. The method of claim 9, wherein the stateless web element includes a decoding function associated with the API function.

14. The method of claim 9, wherein the instructions for the rendered version of the webpage comprise hypertext markup language code.

15. The method of claim 7, wherein the request comprises a hypertext transfer protocol request.

16. A non-transitory computer-readable medium storing a set of instructions for using stateless web elements, the set of instructions comprising:

one or more instructions that, when executed by one or more processors of a device, cause the device to:

receive, from a web host, code associated with a webpage;

perform, using a host application, at least one call to an application programming interface (API) function on behalf of a stateless web element in the webpage;

receive, in response to the at least one call to the API function, encoded data;

pass the encoded data to the stateless web element for decoding;

perform, using the host application, at least one additional call to an additional API function on behalf of an additional stateless web element;

receive, in response to the at least one additional call, additional encoded data;

pass the additional encoded data to the additional stateless web element for decoding; and output a rendered webpage with the stateless web element including a decoded version of the encoded data, wherein the rendered webpage further includes the additional stateless web element with a decoded version of the additional encoded data.

17. The non-transitory computer-readable medium of claim 16, wherein the one or more instructions, that cause the device to output the rendered webpage, cause the device to:

transmit instructions for the rendered webpage to an output component of the device.

18. The non-transitory computer-readable medium of claim 16, wherein the one or more instructions, when executed by the one or more processors, further cause the device to:

transmit, to the web host, a request for the webpage, wherein the code is received in response to the request.

19. The non-transitory computer-readable medium of claim 18, wherein the one or more instructions, when executed by the one or more processors, further cause the device to:

receive input that indicates the webpage, wherein the request is transmitted in response to the input.

20. The non-transitory computer-readable medium of claim 16, wherein the stateless web element includes a decoding function associated with the API function.

* * * * *